(12) United States Patent
Arai

(10) Patent No.: US 11,539,696 B2
(45) Date of Patent: Dec. 27, 2022

(54) RELAY SERVER, AUTHENTICATION SYSTEM, AND RELAY METHOD

(71) Applicant: Ricoh Company, Ltd., Tokyo (JP)

(72) Inventor: Shohei Arai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 73 days.

(21) Appl. No.: 17/159,233

(22) Filed: Jan. 27, 2021

(65) Prior Publication Data
US 2021/0281567 A1   Sep. 9, 2021

(30) Foreign Application Priority Data

Mar. 3, 2020 (JP) ............................. JP2020-036053

(51) Int. Cl.
*H04L 29/06* (2006.01)
*H04L 9/40* (2022.01)
*H04L 67/01* (2022.01)

(52) U.S. Cl.
CPC ........ *H04L 63/0876* (2013.01); *H04L 63/102* (2013.01); *H04L 63/105* (2013.01); *H04L 63/20* (2013.01); *H04L 67/01* (2022.05)

(58) Field of Classification Search
CPC .............. H04L 63/0876; H04L 63/102; H04L 63/105; H04L 63/20; H04L 67/01; H04L 63/083; H04L 67/561
See application file for complete search history.

(56) References Cited

U.S. PATENT DOCUMENTS

| 2004/0128532 | A1 | 7/2004 | Ohishi et al. | |
| 2009/0024751 | A1* | 1/2009 | Taniguchi | H04L 63/08 709/229 |
| 2013/0003106 | A1* | 1/2013 | Nishida | G06F 3/1222 358/1.14 |
| 2015/0264039 | A1* | 9/2015 | Fukuda | G06F 21/335 726/8 |
| 2016/0080374 | A1* | 3/2016 | Kondoh | H04L 63/102 726/4 |
| 2016/0277384 | A1 | 9/2016 | Arai | |

FOREIGN PATENT DOCUMENTS

WO   WO2017/104750 A1   6/2017

* cited by examiner

*Primary Examiner* — Baotran N To
(74) *Attorney, Agent, or Firm* — Xsensus LLP

(57) ABSTRACT

A relay server, an authentication system, and a relay method. The relay server receives an authentication request including authentication parameters from a device, determines whether the authentication parameters included in the authentication request are sufficient for an authentication process performed at an authentication server, assigns one or more missing authentication parameters to the authentication request when the authentication parameters included in the authentication request are determined to be insufficient, and relays the authentication request to the authentication server.

7 Claims, 12 Drawing Sheets

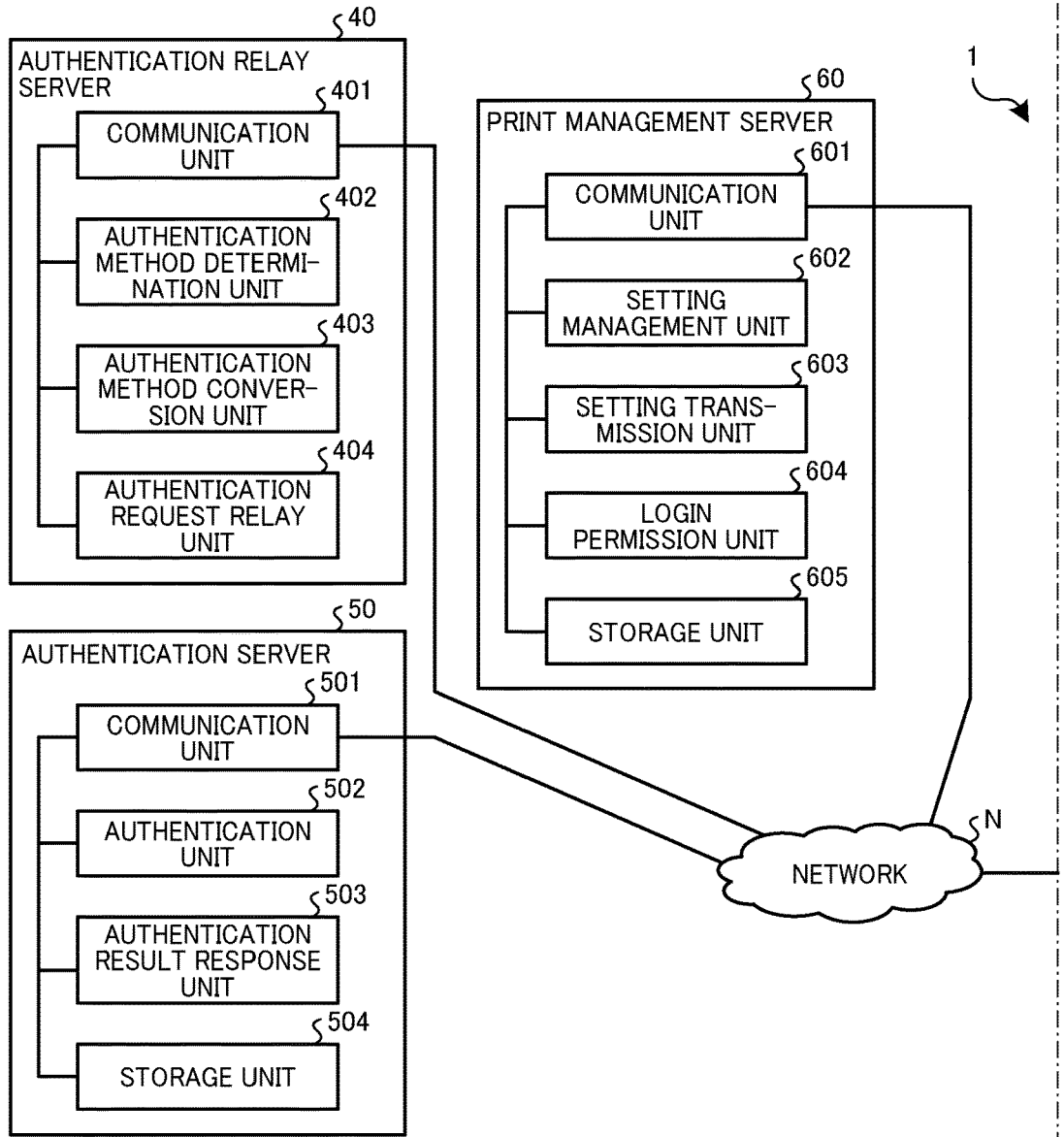

FIG. 5

| USER NAME | PASSWORD |
|---|---|
| USR01 | ABCD |
| USR02 | EFGH |
| ... | ... |

FIG. 6

| TENANT ID | USER NAME | PASSWORD |
|---|---|---|
| TNT0001 | USR0001 | AABBCC |
| TNT0002 | USR0031 | BBCCDD |
| TNT0002 | USR0032 | CCDDEE |
| ... | ... | ... |

FIG. 8

| Authentication Provider Settings | |
|---|---|
| Name | Authentication Relay Server — 1001 |
| Domain Name | example.com — 1002 |
| Authentication Method | LDAP ▶ — 1003 |
| Tenant ID | TNT0001 — 1004 |
| Server Name | authproxy.example.com — 1005 |
| Port Number | 389 — 1006 |
| User Name | admin — 1007 |
| Password | ‥‥‥ — 1008 |
| Relay Server | In-House Relay Server A ▶ — 1009 |

1000

Cancel — 1010    Save — 1011

FIG. 10

Tenant Activation Login

Login with Tenant ID

Tenant ID | TNT0002 | 1101
User Name | USR0031 | 1102
Password | ...... | 1103

☐ Show password

[ Login ] 1104

Apr.23 2019
01:13 PM

Check Status                Stop s1100

RELAY SERVER, AUTHENTICATION SYSTEM, AND RELAY METHOD

CROSS-REFERENCE TO RELATED APPLICATIONS

This patent application is based on and claims priority pursuant to 35 U.S.C. § 119(a) to Japanese Patent Application No. 2020-036053, filed on Mar. 3, 2020, in the Japan Patent Office, the entire disclosure of which is hereby incorporated by reference herein.

BACKGROUND

Technical Field

The present disclosure relates to a relay server, an authentication system, and a relay method.

Related Art

An authentication system in which a device such as a multifunction peripheral requests authentication from an authentication server in a cloud environment or the like is known.

As an example of such authentication system to authenticate between a client and the authentication server with different authentication methods, a system that maps authentication parameters sent from the client with the authentication method of the authentication server by an authentication control server installed between the client and the authentication server is disclosed.

SUMMARY

Embodiments of the present disclosure describe a relay server, an authentication system, and a relay method. The relay server receives an authentication request including authentication parameters from a device, determines whether the authentication parameters included in the authentication request are sufficient for an authentication process performed at an authentication server, assigns one or more missing authentication parameters to the authentication request when the authentication parameters included in the authentication request are determined to be insufficient, and relays the authentication request to the authentication server.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 4A and 4B are block diagrams illustrating an example of a functional configuration of the authentication system according to embodiments of the present disclosure;

FIG. 5 is a diagram illustrating an example of a login management table;

FIG. 6 is a diagram illustrating an example of an authentication management table;

FIG. 8 is a diagram illustrating an example of an authentication provider setting screen;

FIG. 10 is a diagram illustrating an example of a new authentication screen;

Figure 1:
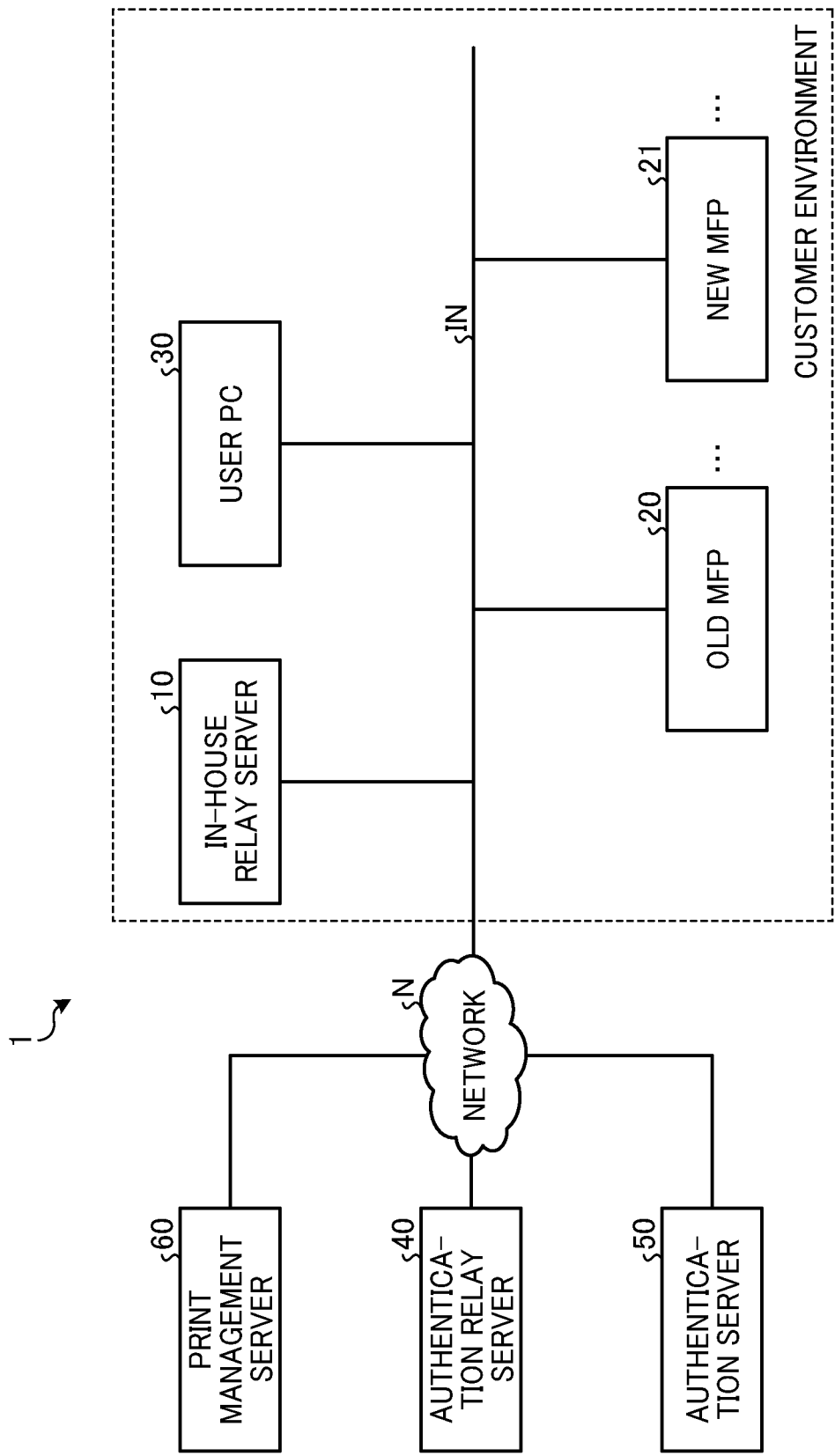
FIG. 1 is a block diagram illustrating an example of an overall configuration of an authentication system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present disclosure. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a relay server, an authentication system, a relay method, and a non-transitory recording medium according to the present disclosure are described in detail with reference to the accompanying drawings. The present disclosure, however, is not limited to the following embodiment, and the constituent elements of the following embodiment include elements that can be easily conceived by those skilled in the art, those being substantially the same ones, and those being within equivalent ranges. Furthermore, various omissions, substitutions, changes and combinations of the constituent elements can be made without departing from the gist of the following embodiments.

In addition, computer software refers to programs related to computer operations and other information used for processing by computers that are equivalent to programs (hereinafter, computer software is referred to as software). An application program, which may be simply referred to as "application", is a general term for any software used to perform certain processing. An operating system (hereinafter simply referred to as an "OS") is software for controlling a computer, such that software, such as application, is able to use computer resource. The OS controls basic operation of the computer such as input or output of data, management of hardware such as a memory or a hard disk, or processing to be executed. The application software operates by utilizing the functions provided by the operating system. The program is a set of instructions for causing the computer to perform processing to have a certain result. While data to be used in processing according to the program is not a program itself, such data may define processing to be performed by the program such that it may be interpreted as equivalent to the program. For example, a data structure, which is a logical structure of data described by an interrelation between data elements, may be interpreted as equivalent to the program.

In the following, as an example of a device that makes an authentication request to an authentication server, a multi-function peripheral (MFP), which is an example of an image forming apparatus, is described as an example, but the present disclosure is not limited to the MFP. For example, the device requiring authentication may be a printer, a scanner, an electronic whiteboard, a projector, a video conference terminal, an automobile, an industrial machine, a medical device, or the like. Note that the MFP is a device having a plurality of different functions such as a copy function, a scanner function, a print function, and a facsimile function.

FIG. 1 is a block diagram illustrating an example of an overall configuration of an authentication system according to the present disclosure. The overall configuration of the authentication system 1 according to the present embodiment is described with reference to FIG. 1.

As illustrated in FIG. 1, the authentication system 1 according to the present embodiment includes an in-house relay server 10, an old MFP 20 (an example of a first device), a new MFP 21 (an example of a second device), a user personal computer (PC) 30, an authentication relay server 40, an authentication server 50, and a print management server 60. The in-house relay server 10, the old MFP 20, the new MFP 21, and the user PC 30 are information processing devices included in a customer (organization) environment that uses a cloud service. The in-house relay server 10, the old MFP 20, the new MFP 21, and the user PC 30 can communicate with each other through an intranet IN, which is a network implemented in the customer environment. Further, the authentication relay server 40, the authentication server 50, and the print management server 60 reside on the cloud, for example, and are connected to a network N such as the internet. Further, the above-mentioned intranet IN is also connected to a network N, and the information processing devices such as the old MFP 20, the new MFP 21, and the user PC 30 in the customer environment can communicate with devices (authentication relay server 40, authentication server 50, print management server 60, etc.) on the network N outside the customer environment through the in-house relay server 10 which is a proxy server.

The in-house relay server 10 is a proxy server implemented in the customer environment. Therefore, the information processing device such as the old MFP 20, the new MFP 21, and the user PC 30 implemented in the customer environment can access the devices (authentication relay server 40, authentication server 50, print management server 60, etc.) on the network N outside the customer environment through the in-house relay server 10. Further, communication from the in-house relay server 10 to the external devices such as the authentication relay server 40, the authentication server 50, and the print management server 60 on the network N is unidirectional, and a communication procedure is adopted in which the request is sent from the in-house relay server 10 and a response is received from an external device that responds to the request.

Here, it is assumed that the old MFP 20 is an old MFP that does not correspond to a specific authentication parameter among the authentication parameters required for an authentication process in the authentication server 50. That is, the old MFP 20 does not have a function for assigning the specific authentication parameter in order to be authenticated by the authentication server 50.

Here, it is assumed that the new MFP 21 is an MFP of a model newer than the old MFP 20 corresponding to the authentication parameters required for the authentication process in the authentication server 50. The new MFP 21 can make an authentication request to the authentication server 50, including the authentication parameters required for receiving the authentication in the authentication server 50.

The user PC 30 is an information processing device for accessing the servers of the network N and making various settings. For example, as described below, the user PC 30 accesses the print management server 60 on the cloud and sets the authentication relay server 40 as the authentication provider.

The authentication relay server 40 relays an authentication request of a specific user received from the old MFP 20 or the new MFP 21 through the in-house relay server 10 to the authentication server 50. The authentication relay server 40 determines necessity of conversion of the authentication method (authentication protocol) based on the authentication request from the old MFP 20 or the new MFP 21 and converts the authentication method when it is necessary to change the authentication method.

The authentication server 50 performs the authentication process in response to the authentication request from the old MFP 20 or the new MFP 21 relayed by the authentication relay server 40. In the present embodiment, in the authentication process by the authentication server 50, it is assumed that a tenant identifier (ID) (an example of organization information) for identifying the organization to which the user belongs, a user name, and a password are required as authentication parameters. The tenant ID can also be regarded as information that identifies the organization to which the old MFP 20 or the new MFP 21 used by the user belongs.

The print management server 60 essentially accepts and manages print execution jobs from the old MFP 20 and the new MFP 21 and the like. In the present embodiment, the print management server 60 also provides a user interface (UI) for setting the user PC 30 in order to set the authentication provider for registering with the in-house relay server 10. The server that provides the UI for setting the authentication provider for the user PC 30 is not limited to the print management server 60 and may be another server. Further, the server that provides the UI may not be a server such as the print management server 60 implemented on the cloud, but a server implemented in the customer environment in the intranet IN.

Figure 2:
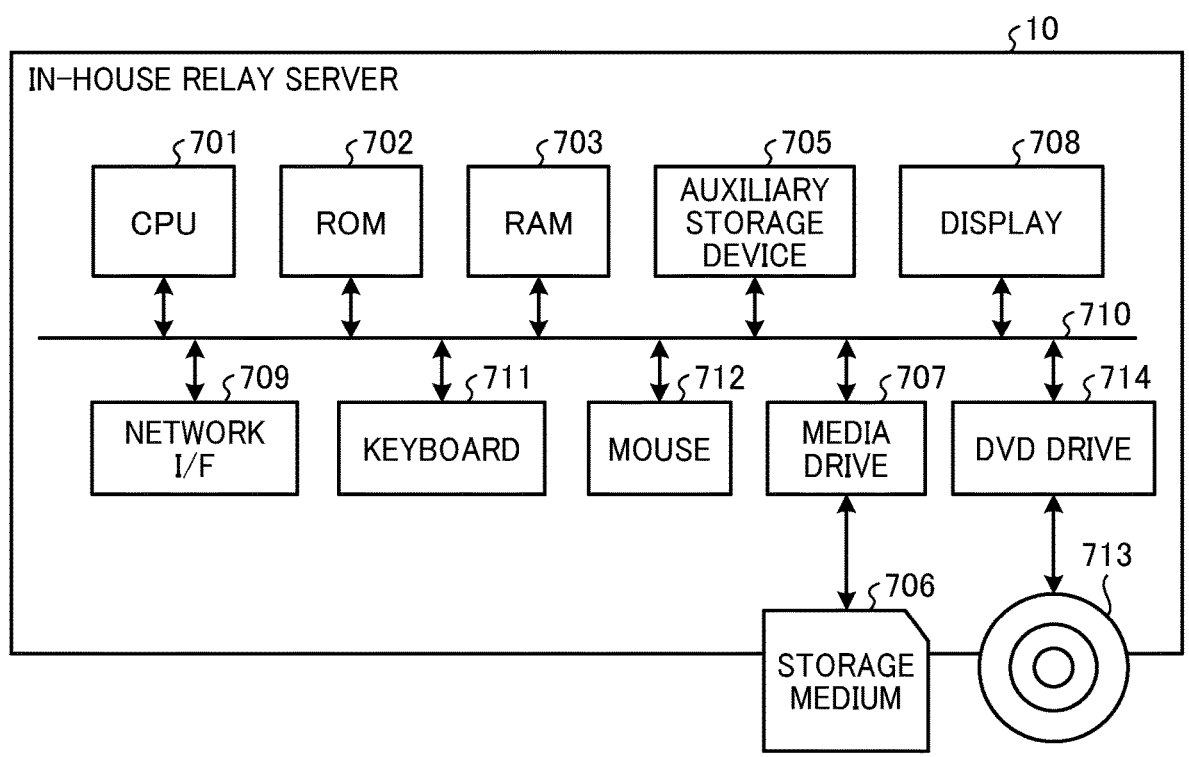
FIG. 2 is a block diagram illustrating a hardware configuration of an in-house relay server according to embodiments of the present disclosure.

FIG. 2 is a block diagram illustrating a hardware configuration of an in-house relay server according to the present disclosure. The hardware configuration of the in-house relay server 10 according to the present embodiment is described with reference to FIG. 2.

As illustrated in FIG. 2, the in-house relay server 10 includes a central processing unit (CPU) 701, a read only memory (ROM) 702, a random access memory (RAM) 703, an auxiliary storage device 705, a media drive 707, a display 708, a network interface (I/F) 709, a keyboard 711, a mouse 712, and a digital versatile disc (DVD) drive 714.

The CPU 701 is a processor that controls entire operation of the in-house relay server 10. The ROM 702 is a nonvolatile storage device that stores a program for the in-house relay server 10. The RAM 703 is a volatile storage device used as a work area of the CPU 701.

The auxiliary storage device 705 is a hard disk drive (HDD) or a solid state drive (SSD) or the like that stores, for example, setting information and the like related to the authentication provider acquired by polling the print management server 60, as described below. The media drive 707 controls reading and writing of data to a storage medium 706 such as a flash memory according to the control of the CPU 701.

The display 708 is a display device implemented by a liquid crystal or an organic electro-luminescence (EL) that displays various information such as a cursor, a menu, a window, characters, or an image.

The network I/F 709 is an interface for communicating data with external devices such as the authentication relay server 40 and the print management server 60 using the network. The network I/F 709 is, for example, a network interface card (NIC) or the like that supports ETHERNET (registered trademark) and is capable of communication conforming to transmission control protocol/internet protocol (TCP/IP) or the like.

The keyboard 711 is an input device for selecting characters, numbers, various instructions, moving a cursor, and the like. The mouse 712 is an input device for selecting and executing various instructions, selecting a processing target, moving a cursor, and the like.

The DVD drive 714 is a device that controls reading and writing of data to a DVD 513 such as a digital versatile disc read only memory (DVD-ROM) or a digital versatile disc recordable (DVD-R) as an example of a removable storage medium.

The CPU 701, ROM 702, RAM 703, auxiliary storage device 705, media drive 707, display 708, network I/F 709, keyboard 711, mouse 712, and DVD drive 714 described above are communicably connected with each other by a bus 710 such as an address bus and a data bus.

Note that the hardware configuration of the in-house relay server 10 illustrated in FIG. 2 is an example and may not include all the components illustrated in FIG. 2 or may include other components. For example, when specializing in processing as an in-house relay server 10 and not requiring input and output of data directly from an input/output device to the in-house relay server 10, the in-house relay server 10 may not include the display 708, the keyboard 711, and the mouse 712. Further, the in-house relay server 10 is not limited to being implemented by a single information processing device illustrated in FIG. 2 and may be implemented by a plurality of network devices such as a plurality of information processing devices.

Further, although the hardware configuration illustrated in FIG. 2 has been described as the hardware configuration of the in-house relay server 10, hardware configurations of the user PC 30, the authentication relay server 40, the authentication server 50, and the print management server 60 also conform to the hardware configuration illustrated in FIG. 2.

Figure 3:
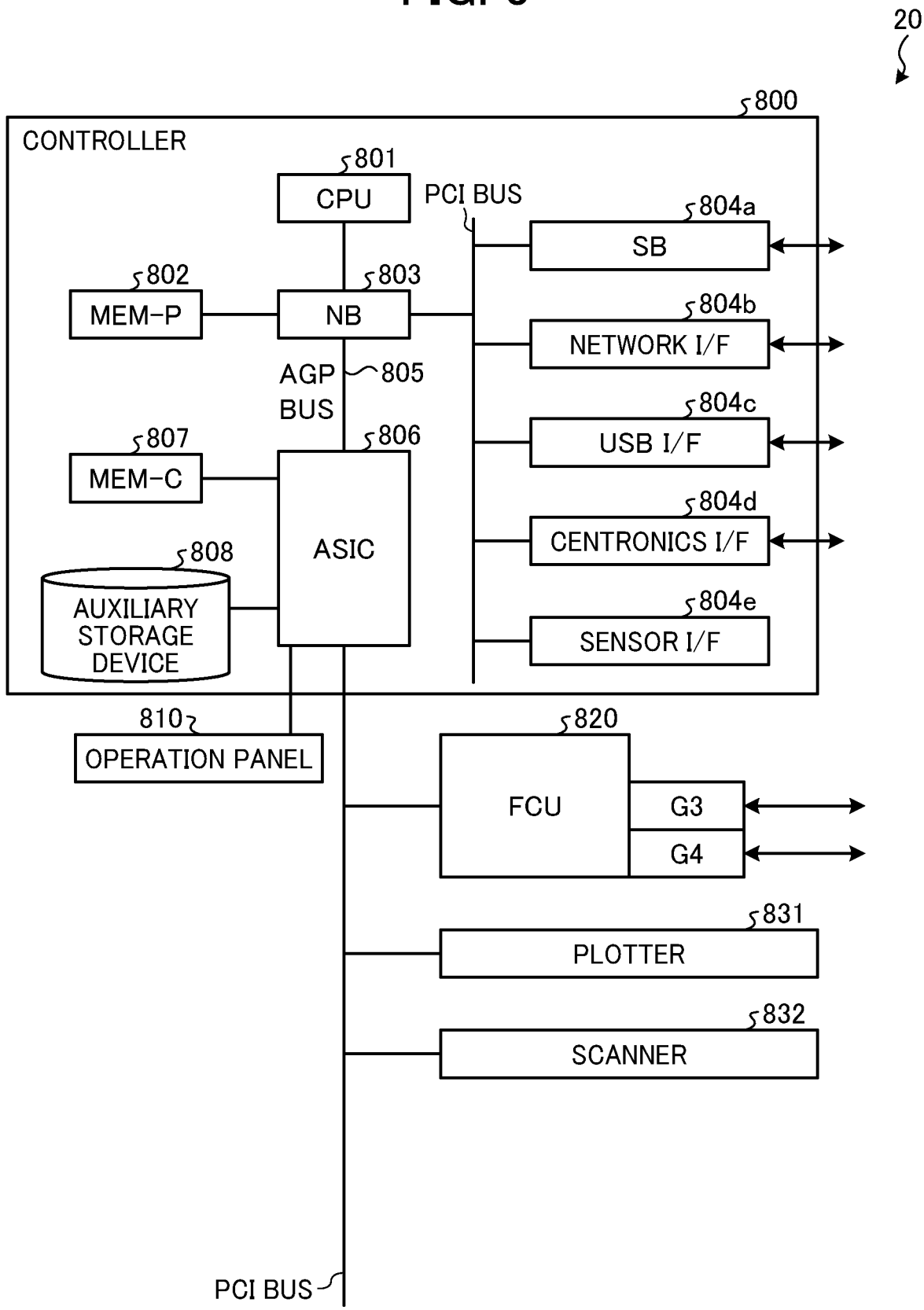
FIG. 3 is a block diagram illustrating a hardware configuration of a multifunction peripheral according to embodiments of the present disclosure.

FIG. 3 is a block diagram illustrating a hardware configuration of the MFP according to the present disclosure. The hardware configuration of the old MFP 20 according to the present embodiment is described with reference to FIG. 3.

As illustrated in FIG. 3, in the old MFP 20, a controller 800, an operation panel 810, a facsimile control unit (FCU) 820, a plotter 831, and a scanner 832 are connected by a peripheral component interface (PCI) bus.

The controller 800 controls overall control, drawing, communication, and input from the operation panel 810 of the entire old MFP 20.

The operation panel 810 is, for example, a touch panel or the like directly connected to an application specific integrated circuit (ASIC) 806, which is described below, and receives input to the controller 800 (input function) and displays status of the old MFP 20.

The FCU 820 implements a facsimile function. The FCU 820 is connected to the ASIC 806 by, for example, the PCI bus.

The plotter 831 implements a printing function, and is connected to the ASIC 806 by, for example, the PCI bus. The scanner 832 implements a scanner function. The scanner 832 is connected to the ASIC 806 by, for example, the PCI bus.

The controller 800 includes a CPU 801, a system memory (MEM-P) 802, a north bridge (NB) 803, a south bridge (SB) 804a, a network I/F 804b, a universal serial bus (USB) I/F 804c, a centronics I/F 804d, a sensor I/F 804e, an ASIC 806, a local memory (MEM-C) 807, and an auxiliary storage device 808.

The CPU 801 controls the entire old MFP 20. The CPU 801 is connected to other devices through a chipset including the MEM-P 802, the NB 803, and the SB 804a.

The MEM-P 802 is used as a memory for storing programs and data, a memory for expanding programs and data, a memory for drawing for a printer, and the like, and includes a ROM and a RAM. The ROM is a read-only memory used as a memory for storing programs and data, and the RAM is a memory for expanding programs and data, and a writable and readable memory used as a drawing memory for a printer and the like.

The NB 803 is a bridge for connecting the CPU 801 to the MEM-P 802, the SB 804a, and the accelerated graphics port (AGP) bus 805 and includes a memory controller that controls reading and writing to the MEM-P 802, a PCI master, and an AGP target.

The SB 804a connects the NB 803 with a PCI device and a peripheral device. The SB 804a is connected to the NB 803 through a PCI bus, and the network I/F 804b, USB I/F 804c, centronics I/F 804d, sensor I/F 804e, and the like are connected to the PCI bus.

The AGP bus 805 is a bus interface for a graphics accelerator card proposed for speeding up graphics processing. The AGP bus 805 directly accesses the MEM-P 802 with high throughput to accelerate the graphics accelerator card.

The ASIC 806 is an integrated circuit (IC) dedicated to an image processing use, and connects the AGP bus 805, the PCI bus, the auxiliary storage device 808, and the MEM-C 807. The ASIC 806 includes a PCI target, an AGP master, an arbiter (ARB) as a central processor of the ASIC 806, a memory controller for controlling the MEM-C 807, a plurality of direct memory access controllers (DMACs) that rotate image data using hardware logic, etc., and a PCI unit that transfers data between the scanner 832 and a plotter 831 through the PCI bus. For example, the FCU 820, the plotter 831 and the scanner 832 are connected to the ASIC 806 through the PCI bus. Further, the ASIC 806 is also connected to a host PC, a network, and the like.

The MEM-C 807 is a memory used as a copy image buffer and a code buffer.

The auxiliary storage device 808 is a storage device such as an HDD, SSD, secure digital (SD) card, or flash memory, and stores image data, programs, font data, and the like.

The hardware configuration of the old MFP 20 illustrated in FIG. 3 is an example and may not include all the components illustrated in FIG. 3 or may include other components.

Further, the hardware configuration illustrated in FIG. 3 has been described as the hardware configuration of the old MFP 20, but the hardware configuration of the new MFP 21 also conforms to the hardware configuration illustrated in FIG. 3.

Figure 4B:
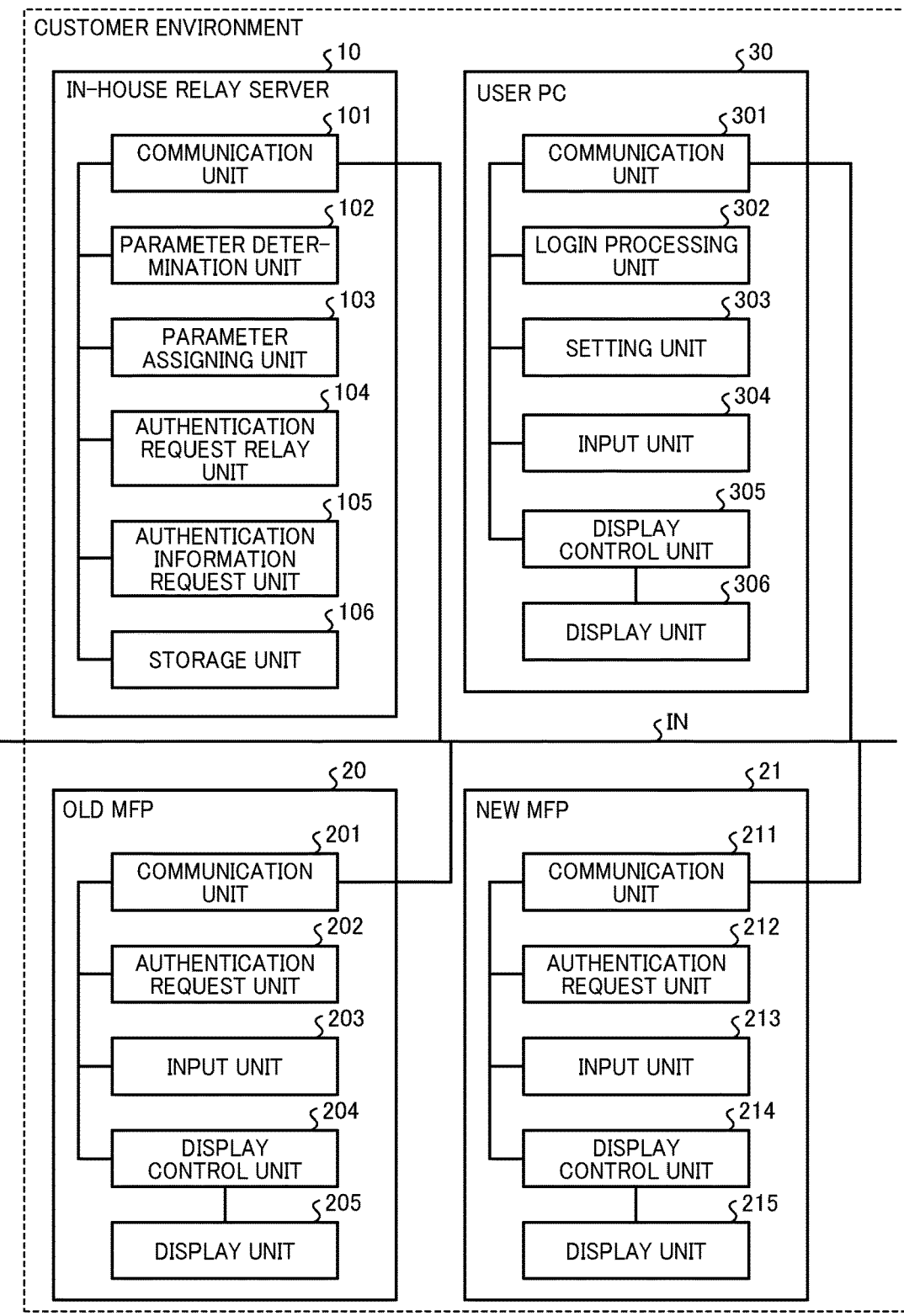

FIGS. 4A and 4B are block diagrams illustrating an example of a functional configuration of the authentication system according to the present disclosure. FIG. 5 is a diagram illustrating an example of a login management table. FIG. 6 is a diagram illustrating an example of an authentication management table. The functional configuration of the authentication system 1 according to the present embodiment is described with reference to FIGS. 4A, 4B, 5, and 6.

As illustrated in FIG. 4B, the in-house relay server 10 includes a communication unit 101, a parameter determination unit 102, and a parameter assigning unit 103, an authentication request relay unit 104, an authentication information request unit 105, and a storage unit 106.

The communication unit 101 performs data communication with each device in the customer environment and various servers on the cloud outside the intranet IN. The communication unit 101 is implemented by executing a program by the CPU 701 and by the network I/F 709 illustrated in FIG. 2.

The parameter determination unit 102 determines whether or not authentication parameters required for the authentication process of the authentication server 50 are included in the authentication parameters included in the authentication request from the old MFP 20 or the new MFP 21. The parameter determination unit 102 is implemented, for example, by the CPU 701 illustrated in FIG. 2 executing a program.

When the parameter determination unit 102 determines that the authentication parameters required for the authentication process of the authentication server 50 are insufficient in the authentication request, the parameter assigning unit 103 assigns insufficient authentication parameters to the authentication request. Specifically, when the parameter determination unit 102 determines that the tenant ID is missing as an authentication parameter required for the authentication process of the authentication server 50, the parameter assigning unit 103 acquires the tenant ID from the setting information related to the authentication provider stored in the storage unit 106 (setting information related to the authentication provider obtained from the print management server 60 by polling), and adds to the authentication request as an authentication parameter. The parameter assigning unit 103 is implemented, for example, by the CPU 701 illustrated in FIG. 2 executing a program.

The authentication request relay unit 104 adds the information of the authentication method (for example, lightweight directory access protocol (LDAP)) required by the authentication request and device information of source of the authentication request (old MFP 20 or new MFP 21 etc.) for the authentication request to which the authentication parameter (tenant ID in this case) is assigned by the parameter assigning unit 103 and relays (transmits) to the authentication relay server 40 through the communication unit 101. If the required authentication method, device information, and the like have already been assigned to the authentication request by the source of the authentication request, the authentication request relay unit 104 does not need to add the authentication parameters. The authentication request relay unit 104 is implemented, for example, by the CPU 701 illustrated in FIG. 2 executing a program.

The authentication information request unit 105 acquires setting information related to the authentication provider set by the user PC 30 and registered in the print management server 60 from the print management server 60 by polling through the network N. The authentication information request unit 105 stores the acquired setting information related to the authentication provider in the storage unit 106. The authentication information request unit 105 is implemented, for example, by the CPU 701 illustrated in FIG. 2 executing a program.

The storage unit 106 stores the setting information and the like related to the authentication provider acquired by polling the print management server 60 by the authentication information request unit 105. The storage unit 106 is implemented by the auxiliary storage device 705 illustrated in FIG. 2.

At least one of the parameter determination unit 102, the parameter assigning unit 103, the authentication request relay unit 104, and the authentication information request unit 105 may be implemented by a hardware circuit such as an ASIC or a field-programmable gate array (FPGA).

Further, each functional unit of the in-house relay server 10 illustrated in FIGS. 4A and 4B conceptually represents a function and the configuration is not limited to the diagrams illustrated in FIGS. 4A and 4B. For example, a plurality of functional units illustrated as independent functional units in the in-house relay server 10 illustrated in FIG. 4B may be configured as one functional unit. On the other hand, in the in-house relay server 10 illustrated in FIG. 4B, function of one functional unit may be divided into a plurality of units to be configured as a plurality of functional units.

As illustrated in FIG. 4B, the old MFP 20 includes a communication unit 201, an authentication request unit 202, an input unit 203, a display control unit 204, and a display unit 205.

The communication unit 201 performs data communication with various devices outside the customer environment on the network N through the in-house relay server 10. In addition, the communication unit 201 performs data communication with each device in the customer environment. The communication unit 201 is implemented by executing a program by the CPU 801 and by the network I/F 804b illustrated in FIG. 3.

The authentication request unit 202 transmits an authentication request including a user name and password input by the input unit 203 as authentication parameters to the in-house relay server 10 through the communication unit 201. The authentication request unit 202 is implemented, for example, by the CPU 801 illustrated in FIG. 3 executing a program.

The input unit 203 receives a data input operation from the user. The input unit 203 is implemented by the input function of the operation panel 810 illustrated in FIG. 3.

The display control unit 204 controls a display operation of the display unit 205. The display control unit 204 is implemented, for example, by the CPU 801 illustrated in FIG. 3 executing a program.

The display unit 205 displays screens and the like of various applications (web application, native application, etc.) under control of the display control unit 204. The display unit 205 is implemented by the display function of the operation panel 810 illustrated in FIG. 3.

At least one of the authentication request unit 202 and the display control unit 204 may be implemented by a hardware circuit such as the ASIC or FPGA.

Further, each functional unit of the old MFP 20 illustrated in FIG. 4B conceptually represents a function and the configuration is not limited to the diagram illustrated in FIG. 4B. For example, a plurality of functional units illustrated as independent functional units in the old MFP 20 illustrated in FIG. 4B may be configured as one functional unit. On the other hand, in the old MFP 20 illustrated in FIG. 4B, function of one functional unit may be divided into a plurality of units to be configured as a plurality of functional units.

As illustrated in FIG. 4B, the new MFP 21 includes a communication unit 211, an authentication request unit 212, an input unit 213, a display control unit 214, and a display unit 215.

The communication unit 211 performs data communication with various devices outside the customer environment on the network N through the in-house relay server 10. In addition, the communication unit 211 performs data communication with each device in the customer environment. The communication unit 211 is implemented by the CPU 801 executing a program and the network I/F 804b illustrated in FIG. 3.

The authentication request unit 212 transmits an authentication request including a user name and password input by the input unit 213 as authentication parameters to the in-house relay server 10 through the communication unit 211. The authentication request unit 212 is implemented, for example, by the CPU 801 illustrated in FIG. 3 executing a program.

The input unit 213 receives a data input operation from the user. The input unit 213 is implemented by the input function of the operation panel 810 illustrated in FIG. 3.

The display control unit 214 controls a display operation of the display unit 215. The display control unit 214 is implemented, for example, by the CPU 801 illustrated in FIG. 3 executing a program.

The display unit 215 displays screens and the like of various applications (web application, native application, etc.) under the control of the display control unit 214. The display unit 215 is implemented by the display function of the operation panel 810 illustrated in FIG. 3.

At least one of the authentication request unit 212 and the display control unit 214 may be implemented by a hardware circuit such as the ASIC or FPGA.

Further, each functional unit of the new MFP 21 illustrated in FIG. 4B conceptually represents a function and the configuration is not limited to the diagram illustrated in FIG. 4B. For example, a plurality of functional units illustrated as independent functional units in the new MFP 21 illustrated in FIG. 4B may be configured as one functional unit. On the other hand, in the new MFP 21 illustrated in FIG. 4B, function of one functional unit may be divided into a plurality of units to be configured as a plurality of functional units.

As illustrated in FIG. 4B, the user PC 30 includes a communication unit 301, a login processing unit 302, a setting unit 303, an input unit 304, a display control unit 305, and a display unit 306.

The communication unit 301 performs data communication with each device in the customer environment and various servers on the cloud outside the intranet IN. The communication unit 301 is implemented by the CPU 701 executing a program and the network I/F 709 illustrated in FIG. 2.

The login processing unit 302 controls an operation of logging in to the print management server 60 in order to make settings related to the authentication provider. Specifically, the login processing unit 302 transmits login information including a user name and password for logging in to the print management server 60 input by the input unit 304 to the in-house relay server 10 through the communication unit 301. The login information transmitted to the in-house relay server 10 is transmitted to the print management server 60 through the network N. The login processing unit 302 is implemented, for example, by the CPU 701 illustrated in FIG. 2 executing a program.

The setting unit 303 logs in to the print management server 60 and makes settings related to the authentication provider on the setting user interface (UI) screen (authentication provider setting screen 1000 illustrated in FIG. 8 to be described below) provided by the print management server 60. The setting unit 303 transmits various setting information related to the authentication provider input through the input unit 304 on the UI screen to the in-house relay server 10 through the communication unit 301. The setting information related to the authentication provider transmitted to the in-house relay server 10 is transmitted to the print management server 60 through the network N. The setting unit 303 is implemented, for example, by the CPU 701 illustrated in FIG. 2 executing a program.

The input unit 304 receives a data input operation from the user. The input unit 304 is implemented by the network OF 709 and the keyboard 711 illustrated in FIG. 2.

The display control unit 305 controls a display operation of the display unit 306. The display control unit 305 is implemented, for example, by the CPU 701 illustrated in FIG. 2 executing a program.

The display unit 306 displays various screens and the like under the control of the display control unit 305. The display unit 306 is implemented by the display 708 illustrated in FIG. 2.

At least one of the login processing unit 302, the setting unit 303, and the display control unit 305 may be implemented by a hardware circuit such as the ASIC or FPGA.

Further, each functional unit of the user PC 30 illustrated in FIG. 4B conceptually represents a function and the configuration is not limited to the diagram illustrated in FIG. 4B. For example, a plurality of functional units illustrated as independent functional units in the user PC 30 illustrated in FIG. 4B may be configured as one functional unit. On the other hand, in the user PC 30 illustrated in FIG. 4B, function of one functional unit may be divided into a plurality of units to be configured as a plurality of functional units.

As illustrated in FIG. 4A, the authentication relay server 40 includes a communication unit 401, an authentication method determination unit 402, and an authentication method conversion unit 403, and an authentication request relay unit 404.

The communication unit 401 receives various requests from the old MFP 20 and the new MFP 21 and transmits a response as a result of processing according to the requests to the old MFP 20 and the new MFP 21. The communication unit 401 is implemented by the CPU 701 executing a program and the network OF 709 illustrated in FIG. 2.

The authentication method determination unit 402 determines whether or not it is necessary to change the authentication method to the authentication method of the authentication server 50 based on the authentication method information included in the authentication request received from the old MFP 20 or the new MFP 21 through the communication unit 401. The authentication method determination unit 402 is implemented, for example, by the CPU 701 illustrated in FIG. 2 executing a program.

The authentication method conversion unit 403 converts the authentication method based on the authentication request into the authentication method of the authentication server 50 when the authentication method determination unit 402 determines that it is necessary to change to the authentication method of the authentication server 50 based on the authentication method information included in the authentication request from the old MFP 20 or the new MFP 21. Specifically, the authentication method conversion unit 403 replaces the authentication method information included in the authentication request from the old MFP 20 or the new MFP 21 with the authentication method information of the authentication server 50. The authentication method conversion unit 403 is implemented, for example, by the CPU 701 illustrated in FIG. 2 executing a program.

The authentication request relay unit 404 relays (transmits) the authentication request converted by the authentication method conversion unit 403 to the authentication server 50 through the communication unit 401 when the authentication method determination unit 402 determines that the conversion of the authentication method is necessary. Further, the authentication request relay unit 404 sorts the authentication request according to at least one of the device information or the tenant ID of the old MFP 20 or the new MFP 21 included in the authentication request and relay the authentication request to the authentication server that is the authentication destination. For example, when the device information included in the authentication request is information indicating the MFP, the authentication request relay unit 404 may relay the authentication request to an authentication server that mainly manages authentication for the MFP. Further, the authentication request relay unit 404 may relay the authentication request to an authentication server that mainly manages the authentication of the organization indicated by the tenant ID included in the authentication request. The authentication request relay unit 404 is implemented, for example, by the CPU 701 illustrated in FIG. 2 executing a program.

At least one of the authentication method determination unit 402, the authentication method conversion unit 403, and the authentication request relay unit 404 may be implemented by a hardware circuit such as the ASIC or FPGA.

Further, each functional unit of the authentication relay server 40 illustrated in FIG. 4A conceptually represents a function and the configuration is not limited to the diagram illustrated in FIG. 4A. For example, a plurality of functional units illustrated as independent functional units in the authentication relay server 40 illustrated in FIG. 4A may be configured as one functional unit. On the other hand, in the authentication relay server 40 illustrated in FIG. 4A, function of one functional unit may be divided into a plurality of units to be configured as a plurality of functional units.

As illustrated in FIG. 4A, the authentication server 50 includes a communication unit 501, an authentication unit 502, an authentication result response unit 503, and a storage unit 504.

The communication unit 501 receives the authentication request from the old MFP 20 and the new MFP 21 and transmits a result of the authentication process by the authentication unit 502. The communication unit 501 is implemented by the CPU 701 executing a program and the network I/F 709 illustrated in FIG. 2.

The authentication unit 502 executes the authentication process based on the authentication request from the old MFP 20 and the communication unit 201 received by the communication unit 501. Specifically, the authentication unit 502 executes the authentication process by referring to the authentication management table illustrated in FIG. 6 stored in the storage unit 504, and determining whether or not a combination of the tenant ID, user name and password included in the authentication request exists in the authentication management table.

The authentication management table illustrated in FIG. 6 manages authentication parameters for the authentication process performed when the user uses the old MFP 20 or the new MFP 21. As illustrated in FIG. 6, in the authentication management table, the tenant ID, the user name, and the password are stored in association with each other. For example, in the authentication management table illustrated in FIG. 6, the tenant ID "TNT0002", the user name "USR0031", and the password "BBCCDD" are stored in association with each other. The above-mentioned authentication management table is information in a table format, but the format is not limited to the table format, and any format of information, for example, if the values of each column of the table can be managed in association with each other, information such as comma separated value (CSV) format may be used.

The authentication unit 502 is implemented, for example, by the CPU 701 illustrated in FIG. 2 executing a program.

The authentication result response unit 503 transmits through the communication unit 501, the result of the authentication process (authentication result) by the authentication unit 502 as a response (authentication response) to the authentication request received by the communication unit 501. The authentication result response unit 503 is implemented, for example, by the CPU 701 illustrated in FIG. 2 executing a program.

The storage unit 504 stores information and the like in the authentication management table illustrated in FIG. 6. The storage unit 504 is implemented by the auxiliary storage device 705 illustrated in FIG. 2.

At least one of the authentication unit 502 and the authentication result response unit 503 may be implemented by a hardware circuit such as the ASIC or FPGA.

Further, each functional unit of the authentication server 50 illustrated in FIG. 4A conceptually represents a function and the configuration is not limited to the diagram illustrated in FIG. 4A. For example, a plurality of functional units illustrated as independent functional units in the authentication server 50 illustrated in FIG. 4A may be configured as one functional unit. On the other hand, in the authentication server 50 illustrated in FIG. 4A, function of one functional unit may be divided into a plurality of units to be configured as a plurality of functional units.

As illustrated in FIG. 4A, the print management server 60 includes a communication unit 601, a setting management unit 602, a setting transmission unit 603, a login permission unit 604, and a storage unit 605.

The communication unit 601 receives various requests from the old MFP 20, the new MFP 21, the user PC 30, and the like, and transmits a response indicating the result of processing according to the requests to the devices. The communication unit 601 is implemented by the CPU 701 executing a program and the network I/F 709 illustrated in FIG. 2.

The setting management unit 602 stores in the storage unit 605, the setting information related to the authentication provider from the user PC 30 received by the communication unit 601. The setting management unit 602 is implemented, for example, by the CPU 701 illustrated in FIG. 2 executing a program.

The setting transmission unit 603 transmits information stored in the storage unit 605 to the in-house relay server 10 through the communication unit 601, when a polling request is received from the in-house relay server 10 to acquire the setting information related to the authentication provider. The setting transmission unit 603 is implemented, for example, by the CPU 701 illustrated in FIG. 2 executing a program.

The login permission unit 604 performs a login process based on the login information when the login information from the user PC 30 is received by the communication unit 601. Specifically, the login permission unit 604 performs the login process by referring to the login management table illustrated in FIG. 5 stored in the storage unit 605 and determining whether or not the combination of the user name and password for logging in to the print management server 60 included in the login information exists in the login management table.

The login management table illustrated in FIG. 5 stores user information for the login process performed when the user of the user PC 30 logs in to the print management server 60. As illustrated in FIG. 5, the user name and the password are stored in association with each other in the login management table. For example, in the login management table illustrated in FIG. 5, the user name "USR01" and the password "ABCD" are stored in association with each other. The above-mentioned login management table is information in a table format, but the format is not limited to the table format, and any format of information, for example, if the values of each column of the table can be managed in association with each other, format such as CSV format may be used.

The login permission unit 604 is implemented, for example, by the CPU 701 illustrated in FIG. 2 executing a program.

The storage unit 605 stores information on the login management table illustrated in FIG. 5, setting information related to the authentication provider from the user PC 30, and the like. The storage unit 605 is implemented by the auxiliary storage device 705 illustrated in FIG. 2.

At least one of the setting management unit 602, the setting transmission unit 603, and the login permission unit 604 may be implemented by a hardware circuit such as the ASIC or FPGA.

Further, each functional unit of the print management server 60 illustrated in FIG. 4A conceptually represents a function and the configuration is not limited to the diagram illustrated in FIG. 4A. For example, a plurality of functional units illustrated as independent functional units in the print management server 60 illustrated in FIG. 4A may be configured as one functional unit. On the other hand, in the print management server 60 illustrated in FIG. 4A, function of one functional unit may be divided into a plurality of units to be configured as a plurality of functional units.

Further, the functions of the various devices illustrated in FIGS. 4A and 4B are not limited to be provided by the devices. For example, in the in-house relay server 10, the parameter determination unit 102 determines the authentication parameter and the parameter assigning unit 103 performs the process of assigning the authentication parameter, but the functions of the parameter determination unit 102 and the parameter assigning unit 103 may be provided to the authentication relay server 40 instead of the in-house relay server 10. In addition, in the authentication relay server 40, the authentication method determination unit 402 determines the authentication method, and the authentication method conversion unit 403 converts the authentication method, but the functions of the authentication method determination unit 402 and the authentication method conversion unit 403 may be provided to the in-house relay server 10 instead of the authentication relay server 40. Further, the authentication request relay unit 404 in the authentication relay server 40 sorts the authentication request based on the information (tenant ID, device information, etc.) included in the authentication request and relay the authentication request to the authentication server that is the authentication destination, but the sorting function may be provided in the authentication request relay unit 104 of the in-house relay server 10.

Figure 7:
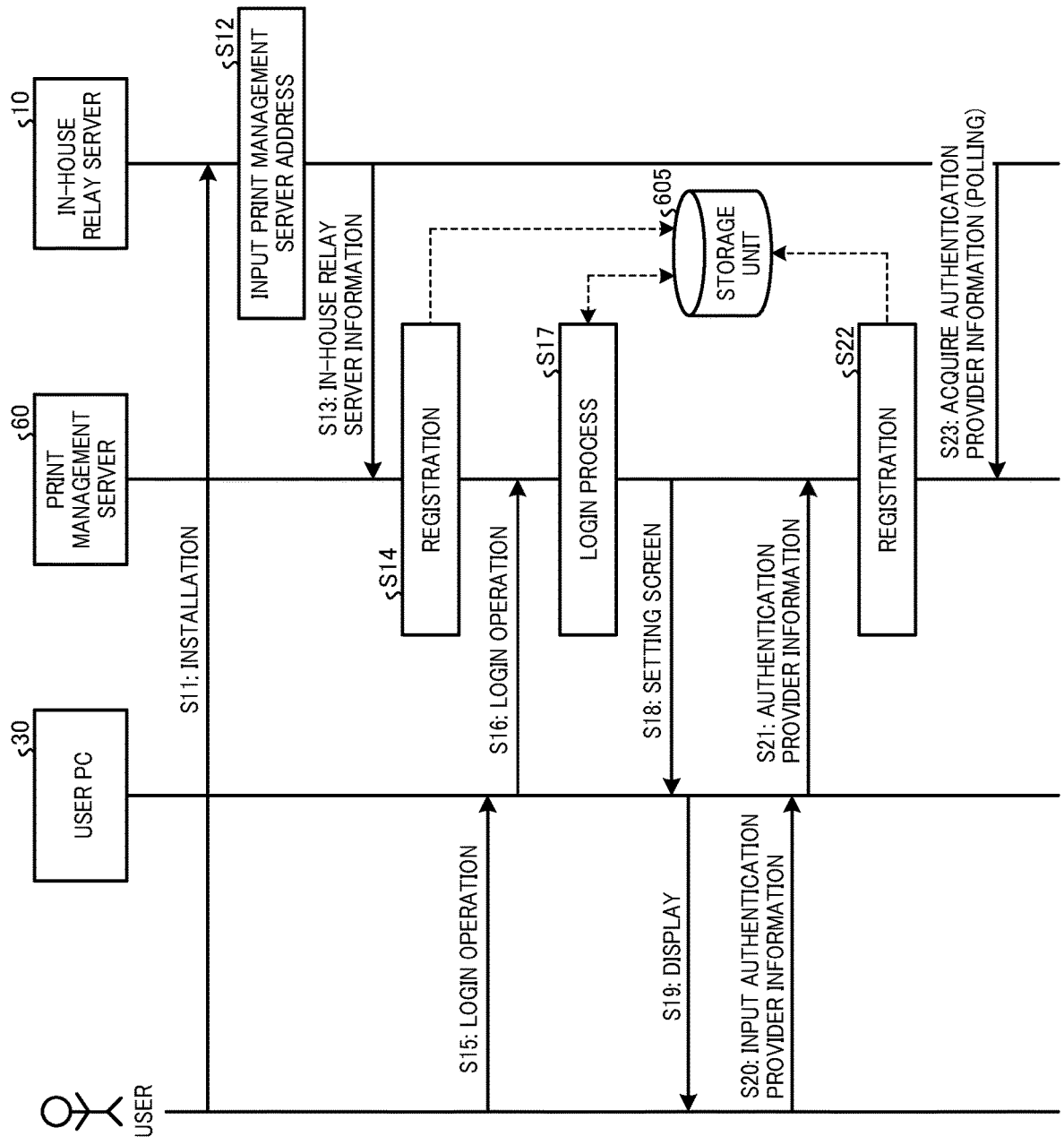
FIG. 7 is a sequence diagram illustrating an example of a construction process of the in-house relay server according to embodiments of the present disclosure.

FIG. 7 is a sequence diagram illustrating an example of a construction process of the in-house relay server according to the present disclosure. FIG. 8 is a diagram illustrating an example of an authentication provider setting screen. The construction process of the in-house relay server 10 according to the present embodiment is described with reference to FIGS. 7 and 8.

In step S11, the user performs setup work including installation of a program or the like on the in-house relay server 10 as a proxy server in the customer environment.

In step S12, the user inputs an address (for example, an internet protocol (IP) address) of the print management server 60 as the setup work.

When the setup work for the in-house relay server 10 is completed and the operation is started, the in-house relay server 10 transmits the in-house relay server information such as the IP address to the print management server 60 through the network N in step S13. In step S14, the print management server 60 receives the in-house relay server information and stores the received information in the storage unit 605. As a result, for example, an information processing device such as a user PC 30 in the customer environment can access and log in to the print management server 60 through the in-house relay server 10.

In step S15, the user inputs a user name and a password for logging in to the print management server 60 through the input unit 304 of the user PC 30. In step S16, the login processing unit 302 of the user PC 30 transmits the login information including the user name and password input by the input unit 304 to the in-house relay server 10 through the communication unit 301. The login information transmitted to the in-house relay server 10 is transmitted to the print management server 60 through the network N. Then, the communication unit 601 of the print management server 60 receives the login information. As described above, thereafter, the communication between the user PC 30 and the print management server 60 is performed through the in-house relay server 10.

In step S17, the login permission unit 604 of the print management server 60 performs a login process based on the login information received by the communication unit 601. Specifically, the login permission unit 604 performs the login process by referring to the login management table illustrated in FIG. 5 stored in the storage unit 605 and determining whether or not the combination of the user name and password for logging in to the print management server 60 included in the login information exists in the login management table.

When the login process by the login permission unit 604 is successful, the communication unit 601 transmits to the user PC 30 the information on the screen for setting the authentication provider stored in the storage unit 605 in step S18. The communication unit 301 of the user PC 30 receives the information on the screen.

In step S19, the display control unit 305 of the user PC 30 causes the display unit 306 to display, for example, the authentication provider setting screen 1000 illustrated in FIG. 8 as a screen for setting the authentication provider received by the communication unit 301.

The authentication provider setting screen 1000 illustrated in FIG. 8 is a screen for entering setting information related to the authentication provider. As illustrated in FIG. 8, the authentication provider setting screen 1000 includes an authentication provider name input field 1001, a domain name input field 1002, an authentication method input field 1003, a tenant ID input field 1004, a server name input field 1005, a port number input field 1006, a user name input field 1007, a password input field 1008, a relay server input field 1009, a cancel button 1010, and a save button 1011.

The authentication provider name input field 1001 is an input area for the name of an authentication relay server (here, the authentication relay server 40) set as the authentication provider. The domain name input field 1002 is an input area for a domain name of the authentication relay server to be set. The authentication method input field 1003 is an area for setting an authentication method to be converted (authentication method before conversion) into the authentication method of the authentication server 50 by the authentication method conversion unit 403. In the example illustrated in FIG. 8, "LDAP" is input to the authentication method input field 1003.

The tenant ID input field 1004 is an input area for information (here, tenant ID) to be given as an authentication parameter required for the authentication process in the authentication server 50 in response to the received authentication request.

The server name input field 1005 is an input area for inputting a server name set by the authentication provider. The port number input field 1006 is an input area for setting a port number when accessing the authentication provider.

The user name input field 1007 is an input area for an administrator's user name that permits setting of information related to the authentication provider on the authentication provider setting screen 1000. The password input field 1008 is an administrator password input area for permitting the setting of information related to the authentication provider on the authentication provider setting screen 1000.

The relay server input field 1009 is an input area for setting the in-house relay server 10. In the example illustrated in FIG. 8, "in-house relay server A" is input to the relay server input field 1009.

The cancel button 1010 is a button for canceling the settings input in each of the above-mentioned input areas. The save button 1011 is a button for confirming the settings input in each of the above-mentioned input areas and registering the settings on the print management server 60.

In step S20, the user inputs setting information related to the authentication provider on the authentication provider setting screen 1000 through the input unit 304 of the user PC 30. In step S21, when the save button 1011 is pressed by the user, the setting unit 303 of the user PC 30 determines the input setting information regarding the authentication provider and transmits the input authentication provider information to the print management server 60 through the communication unit 301. Then, the communication unit 601 of the print management server 60 receives the authentication provider information.

In step S22, the setting management unit 602 of the print management server 60 stores (registers) the authentication provider information (setting information related to the authentication provider) received by the communication unit 601 in the storage unit 605.

In step S23, the authentication information request unit 105 of the in-house relay server 10 acquires the setting information related to the authentication provider registered in the print management server 60 from the print management server 60 (setting transmission unit 603) by polling through the network N and stores the setting information in storage unit 106. The in-house relay server 10 acquires the setting information from the print management server 60 by polling because the print management server 60 is on the cloud and cannot send a request to the in-house relay server 10.

Through the processing of steps S11 to S23 above, the in-house relay server 10 in which the setting information related to the authentication provider is registered uses the setting information to relay the authentication request for the old MFP 20 or the new MFP 21 or the like to the authentication relay server 40 and the authentication server 50.

Figure 9:
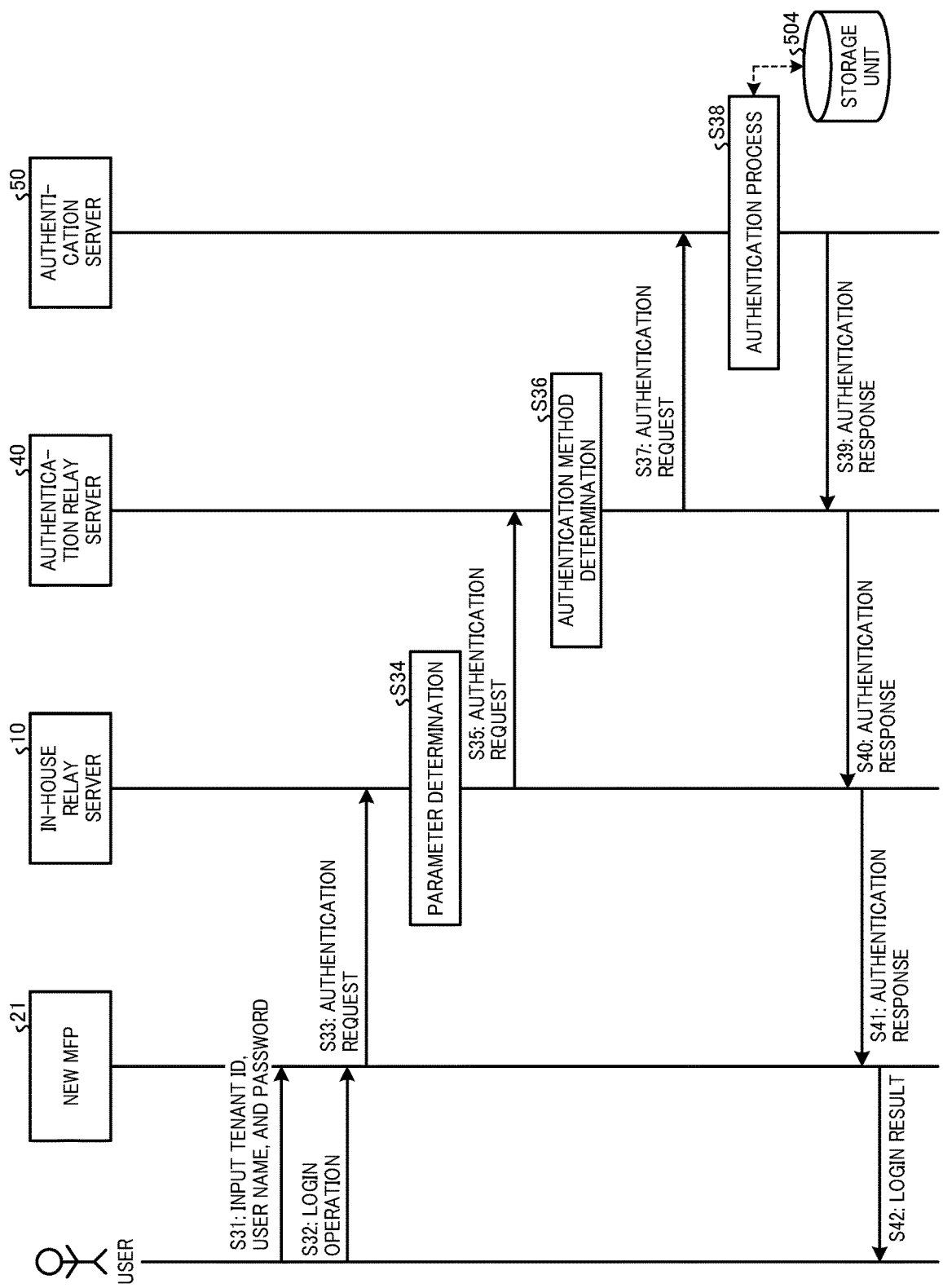
FIG. 9 is a sequence diagram illustrating an example of an authentication process of a new multifunction peripheral according to embodiments of the present disclosure.

FIG. 9 is a sequence diagram illustrating an example of an authentication process of the new MFP according to the present disclosure. FIG. 10 is a diagram illustrating an example of a new authentication screen. The authentication process of the new MFP 21 is described with reference to FIGS. 9 and 10. Note that the authentication process is described assuming that the tenant ID, user name and password, which are the authentication parameters required for the authentication process by the authentication server 50 can be entered in the new MFP 21.

In step S31, when the user uses the new MFP 21, the user inputs the tenant ID, user name, and password as authentication parameters for receiving authentication by the authentication server 50, for example, through the input unit 213 of the new MFP 21, using the new authentication screen 1100 illustrated in FIG. 10.

The new authentication screen 1100 illustrated in FIG. 10 is an authentication screen for inputting authentication parameters when using the new MFP 21. As illustrated in FIG. 10, the new authentication screen 1100 includes a tenant ID input field 1101, a user name input field 1102, a password input field 1103, and a login button 1104.

The tenant ID input field 1101 is an input area for inputting the tenant ID as the authentication parameter of the authentication process by the authentication server 50. The user name input field 1102 is an input area for inputting the user name as the authentication parameter of the authentication process by the authentication server 50. The password input field 1103 is an input area for inputting the password as the authentication parameter of the authentication process by the authentication server 50.

The login button 1104 is a button for making an authentication request to the authentication server 50 based on the authentication parameters input to the tenant ID input field 1101, the user name input field 1102, and the password input field 1103.

In step S32, after entering the tenant ID, user name and password on the new authentication screen 1100, the user presses the login button 1104 (login operation) through the input unit 213.

In step S33, the authentication request unit 212 of the new MFP 21 transmits an authentication request including the tenant ID, the user name and the password input by the input unit 213 to the in-house relay server 10 through the communication unit 211. The communication unit 101 of the in-house relay server 10 receives the authentication request.

In step S34, when the communication unit 101 receives the authentication request, the parameter determination unit 102 of the in-house relay server 10 determines whether the authentication parameters required for the authentication process of the authentication server 50 are sufficient based on the authentication parameters included in the authentication request. The parameter determination unit 102 determines that the authentication request includes all the authentication parameters required for the authentication process on the authentication server 50.

In step S35, for the authentication request for which the determination by the parameter determination unit 102 is completed, the authentication request relay unit 104 of the in-house relay server 10 adds the information of the authentication method required by the authentication request and the device information of the new MFP 21 that is the source of the authentication request, and relays (transmits) to the authentication relay server 40 through the communication unit 101. Then, the communication unit 401 of the authentication relay server 40 receives the authentication request to which the authentication method information and the device information are added.

In step S36, the authentication method determination unit 402 of the authentication relay server 40 determines whether or not it is necessary to change to the authentication method of the authentication server 50 from the authentication method information included in the authentication request received by the communication unit 401. Here, it is assumed that the authentication method determination unit 402 determines that the conversion of the authentication method is not necessary.

In step S37, the authentication request relay unit 404 of the authentication relay server 40 sorts the authentication request according to at least one of the device information or the tenant ID included in the authentication request and relays the authentication request to the authentication server that is the authentication destination. Here, it is assumed that the authentication request relay unit 404 relays to the authentication server 50 as the authentication destination. Then, the communication unit 501 of the authentication server 50 receives the authentication request.

In step S38, the authentication unit 502 of the authentication server 50 executes the authentication process based on the authentication request received by the communication unit 501. Specifically, the authentication unit 502 refers to the authentication management table illustrated in FIG. 6 stored in the storage unit 504 and determines whether the combination of the tenant ID, the user name, and the password included in the authentication request exists in the authentication management table.

In step S39, the authentication result response unit 503 of the authentication server 50 relays the result of the authentication process by the authentication unit 502 (authentication result) as a response (authentication response) to the authentication request received by the communication unit 501 through the communication unit 501 to the authentication relay server 40. Then, the communication unit 401 of the authentication relay server 40 receives the authentication response.

In steps S40 and S41, the communication unit 401 of the authentication relay server transmits the received authentication response to the new MFP 21 through the in-house relay server 10. Then, the communication unit 211 of the new MFP 21 receives the authentication response.

In step S42, the display control unit 214 of the new MFP 21 causes the display unit 215 to display the content of the authentication response (login result indicating authentication success or authentication failure) received by the communication unit 211.

The authentication process of the new MFP 21 is performed according to steps S31 to S42 described above.

Figure 11:
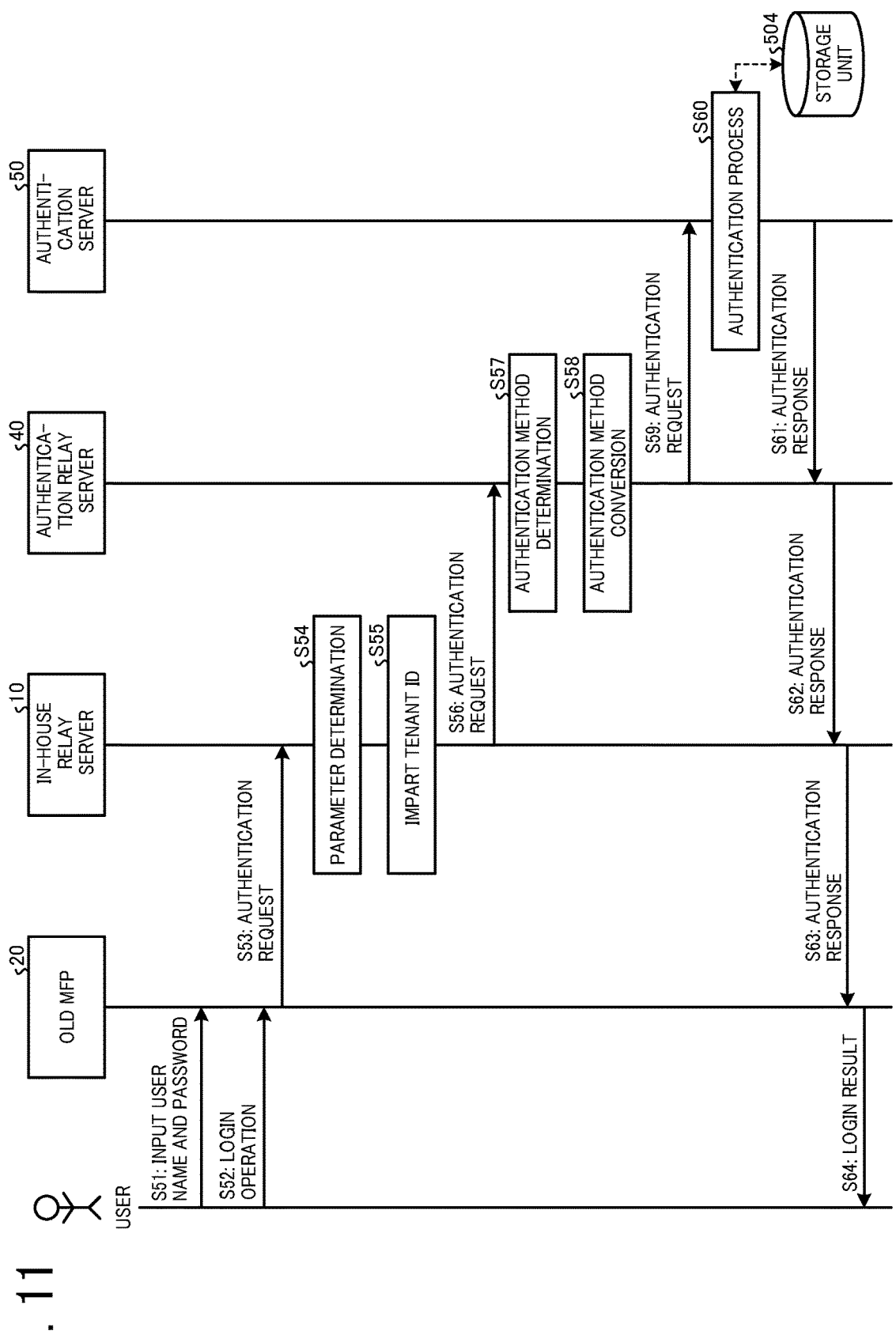
FIG. 11 is a sequence diagram illustrating an example of an authentication process of an old multifunction peripheral according to embodiments of the present disclosure.
Figure 12:
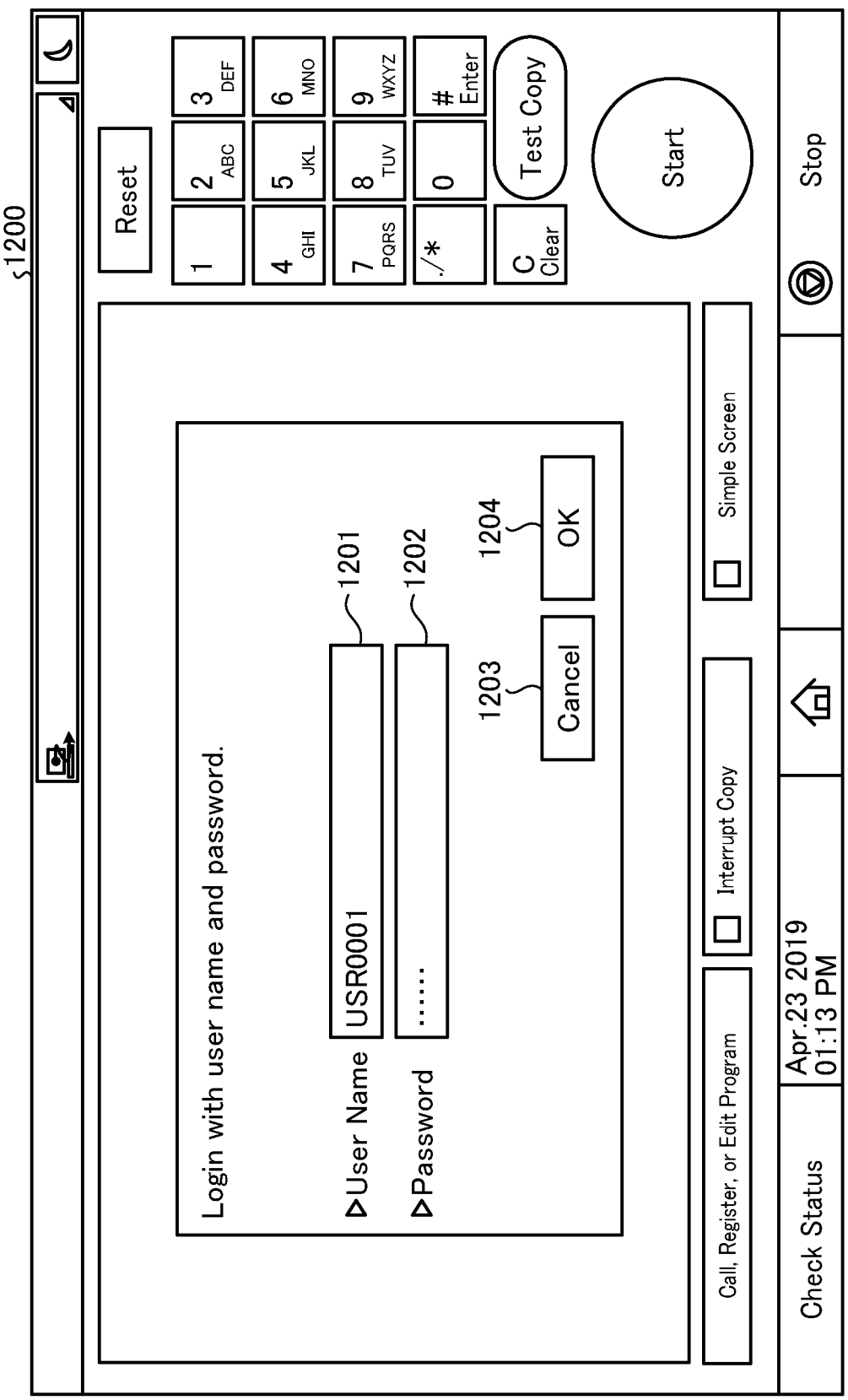
FIG. 12 is a diagram illustrating an example of an old authentication screen.

FIG. 11 is a sequence diagram illustrating an example of an authentication process of the old MFP according to the present disclosure. FIG. 12 is a diagram illustrating an example of an old authentication screen. The authentication process of the old MFP 20 is described with reference to FIGS. 11 and 12. The following description assumes that the tenant ID is not accepted in the old MFP 20 among the authentication parameters required for the authentication process by the authentication server 50.

In step S51, when the user uses the old MFP 20, the user inputs the user name and password as authentication parameters for receiving authentication by the authentication server 50, for example, through the input unit 203 of the old MFP 20, using the old authentication screen 1200 illustrated in FIG. 12.

The old authentication screen 1200 illustrated in FIG. 12 is an authentication screen for inputting authentication parameters when using the old MFP 20. As illustrated in FIG. 12, the old authentication screen 1200 includes a user name input field 1201, a password input field 1202, a cancel button 1203, and an OK button 1204.

The user name input field 1201 is an input area for inputting the user name as the authentication parameter of the authentication process by the authentication server 50. The password input field 1202 is an input area for inputting the password as the authentication parameter of the authentication process by the authentication server 50.

The cancel button 1203 is a button for canceling the authentication request. The OK button 1204 is a button for making an authentication request to the authentication server 50 based on the authentication parameters input to the user name input field 1201 and the password input field 1202.

In step S52, after entering the user name and password on the old authentication screen 1200, the user presses the OK button 1204 (login operation) through the input unit 203.

In step S53, the authentication request unit 202 of the old MFP 20 transmits an authentication request including the user name and the password input by the input unit 203 to the in-house relay server 10 through the communication unit 201. The communication unit 101 of the in-house relay server 10 receives the authentication request.

In step S54, when the communication unit 101 receives the authentication request, the parameter determination unit 102 of the in-house relay server 10 determines whether the authentication parameters required for the authentication process of the authentication server 50 are sufficient based on the authentication parameters included in the authentication request. The parameter determination unit 102 determines that the authentication request lacks the tenant ID required for the authentication process on the authentication server 50.

The parameter assigning unit 103 assigns the tenant ID to the authentication request as the authentication parameter determined to be insufficient by the parameter determination unit 102. Specifically, the parameter assigning unit 103 acquires the tenant ID from the setting information related to the authentication provider stored in the storage unit 106 (setting information related to the authentication provider obtained from the print management server 60 by polling) and adds the tenant ID to the authentication request as the authentication parameter.

In step S56, the authentication request relay unit 104 of the in-house relay server 10 adds to the authentication request that the tenant ID is assigned by the parameter assigning unit 103, the information of the authentication method required by the authentication request and the device information of the old MFP 20 that is the source of the authentication request and relays (transmits) to the authentication relay server 40 through the communication unit 101. Then, the communication unit 401 of the authentication relay server 40 receives the authentication request to which the authentication method information and the device information are added.

In step S57, the authentication method determination unit 402 of the authentication relay server 40 determines whether or not it is necessary to change the authentication method to the authentication method of the authentication server 50 from the authentication method information included in the authentication request received by the communication unit 401. Here, it is assumed that the authentication method determination unit 402 determines that the authentication method indicated by the authentication request does not correspond to the authentication method of the authentication process by the authentication server 50.

The authentication method conversion unit 403 of the authentication relay server 40 converts the authentication method indicated by the authentication request into the authentication method of the authentication server 50. Specifically, the authentication method conversion unit 403 replaces the authentication method information included in the authentication request with the authentication method information of the authentication server 50.

In step S37, the authentication request relay unit 404 of the authentication relay server 40 sorts the authentication request according to at least one of the device information or the tenant ID included in the authentication request and relays the authentication request to the authentication server that is the authentication destination. Here, it is assumed that the authentication request relay unit 404 relays to the authentication server 50 as the authentication destination. Then, the communication unit 501 of the authentication server 50 receives the authentication request.

In step S60, the authentication unit 502 of the authentication server 50 executes the authentication process based on the authentication request received by the communication unit 501. Specifically, the authentication unit 502 refers to the authentication management table illustrated in FIG. 6 stored in the storage unit 504 and determines whether the combination of the tenant ID (tenant ID assigned in step S55), the user name, and the password included in the authentication request exists in the authentication management table.

In step S39, the authentication result response unit 503 of the authentication server 50 relays the result of the authentication process by the authentication unit 502 (authentication result) as a response (authentication response) to the authentication request received by the communication unit 501 through the communication unit 501 to the authentication relay server 40. For example, when the tenant ID is not included in the authentication request, the authentication result response unit 503 sends an authentication response indicating that the authentication has failed to the authentication relay server 40. Then, the communication unit 401 of the authentication relay server 40 receives the authentication response.

In steps S62 and S63, the communication unit 401 of the authentication relay server transmits the received authentication response to the old MFP 20 through the in-house relay server 10. Then, the communication unit 201 of the old MFP 20 receives the authentication response.

In step S64, the display control unit 204 of the old MFP 20 causes the display unit 205 to display the content of the authentication response (login result indicating authentication success or authentication failure) received by the communication unit 201.

The authentication process of the old MFP 20 is performed according to steps S51 to S64 described above.

As described above, in the authentication system 1 according to the present embodiment, when the authentication parameters required for the authentication process of the authentication server 50 include an authentication parameter that is not supported by a device such as the MFP that requests the authentication, that is, if there is authentication parameter that cannot be entered on the device, the relay server such as the in-house relay server 10 that relays the authentication request automatically assigns unsupported authentication parameter (tenant ID, etc.), and the authentication request is transmitted to the authentication server 50. As a result, among the authentication parameters required for the authentication process in the authentication server 50, the authentication can be performed even when there is an authentication parameter that the existing device (old MFP 20 or the like) does not support. As described above, the missing authentication parameter may be assigned by the authentication relay server 40 instead of the in-house relay server 10.

Further, in the authentication system 1, when the authentication method required by the authentication request from the device is different from the authentication method of the authentication process of the authentication server 50, the relay server such as the authentication relay server 40 that relays the authentication request converts the authentication method into the authentication method of the authentication process of the authentication server 50. As a result, even if the authentication method corresponding to the device is different from the authentication method of the authentication process of the authentication server 50, the authentication method can be converted, so that the authentication process of the authentication server 50 becomes possible.

Further, in the authentication system 1, the relay server such as the authentication relay server 40 that relays an authentication request from a device such as the old MFP 20 or the new MFP 21 sorts the authentication request according to the information (for example, device information, tenant ID, etc.) included in the authentication request and relays the authentication request to the authentication server that is the authentication destination. As a result, it is possible to distribute the authentication request to an authentication server corresponding to the authentication of each device. For example, different authentication servers can be installed for each company or country from the viewpoint of protection of personal information. Further, the authentication request from the old MFP 20 can be distributed to an authentication server different from the authentication server corresponding to the authentication request from the new MFP 21. As a result, when the old MFP 20 is authenticated, range of access may be changed, for example, functions that can be used may be limited.

In the above description, it is assumed that the tenant ID is insufficient as an authentication parameter in the authentication request from the old MFP 20, but the present disclosure is not limited to this example. For example, in the authentication process of the authentication server 50, when an authentication parameter different from the tenant ID is required in addition to the user name and password, and the authentication parameter is missing in the authentication request from the old MFP 20, the missing authentication parameter may be added by the parameter assigning unit 103.

Each of the functions of the above-described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

Further, in the above-described embodiments, when at least one of the functional units of the in-house relay server 10, the old MFP 20, the new MFP 21, the user PC 30, the authentication relay server 40, the authentication server 50, and the print management server 60 is implemented by executing a program, the program is provided in advance in a ROM or the like. Further, the programs executed by the in-house relay server 10, the old MFP 20, the new MFP 21, the user PC 30, the authentication relay server 40, the authentication server 50, and the print management server 60 according to the above-described embodiment may be configured to be recorded and provided on a computer-readable recording medium such as compact disc read only memory (CD-ROM), flexible disc (FD), compact disc-recordable (CD-R), DVD or secure digital (SD) cards in installable or executable formats. In addition, the programs executed by the in-house relay server 10, the old MFP 20, the new MFP 21, the user PC 30, the authentication relay server 40, the authentication server 50, and the print management server 60 according to the above-described embodiments may be configured to be provided by storing on a computer connected to a network such as the internet and downloading through the network. Further, a program executed by the in-house relay server 10, the old MFP 20, the new MFP 21, the user PC 30, the authentication relay server 40, the authentication server 50, and the print management server 60 according to the above-described embodiment may be configured to be provided or distributed through a network such as the internet. Further, the programs executed by the in-house relay server 10, the old MFP 20, the new MFP 21, the user PC 30, the authentication relay server 40, the authentication server 50, and the print management server 60 according to the above-described embodiment have modular configuration that includes at least one of the above-mentioned functional units. In actual hardware, the CPU reads a program from the above-mentioned storage device and executes the program. Each of the above-mentioned functional units is loaded and generated on the main memory.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A relay server, comprising:
circuitry configured to:
receive an authentication request including authentication parameters from a device;
determine whether the authentication parameters included in the authentication request are sufficient for an authentication process performed at an authentication server, wherein the authentication server is an authentication destination, and the authentication request includes organization information that identifies an organization to which the device belongs as one of the authentication parameters;
assign one or more missing authentication parameters to the authentication request when the authentication parameters included in the authentication request are determined to be insufficient;
sort the authentication request according to the organization information included in the authentication request; and
relay the authentication request to the authentication server.

2. The relay server of claim 1, wherein
the circuitry is configured to relay the authentication request from the device to the authentication server different from another authentication server that is an authentication destination for another device, and
the another device is of a newer model compared to the device that sends the authentication request.

3. The relay server of claim 1, wherein the circuitry is further configured to:
determine whether an authentication method of the authentication request from the device is to be converted to the authentication method of the authentication server that is the authentication destination; and
when the authentication method is determined to be converted, convert the authentication method of the authentication request into the authentication method of the authentication server that is the authentication destination.

4. The relay server of claim 1, wherein the device is a multifunction peripheral.

5. The relay server of claim 1, further comprising:
a memory that stores the authentication parameters to be assigned to the authentication request, wherein
when the authentication parameters included in the authentication request is determined to be insufficient, the circuitry is configured to:
acquire the one or more missing authentication parameters from the memory; and
assign the one or more missing authentication parameters to the authentication request.

6. An authentication system, comprising:
one or more servers; and
a device including first circuitry configured to transmit an authentication request including authentication parameters, wherein the one or more servers include second circuitry configured to:
  receive the authentication request transmitted from the device;
  determine whether the authentication parameters required for an authentication process performed at an authentication server are included in the authentication parameters included in the authentication request, wherein the authentication server is an authentication destination, and the authentication request includes organization information that identifies an organization to which the device belongs as one of the authentication parameters;
  when the authentication parameters included in the authentication request is determined to be insufficient, assign one or more missing authentication parameters to the authentication request;
  sort the authentication request according to the organization information included in the authentication request; and
  perform the authentication process based on the authentication request that includes the one or more missing authentication parameters assigned.

7. A relay method, comprising:
  receiving an authentication request including authentication parameters from a device;
  determining whether authentication parameters required for an authentication process performed at an authentication server are included in the authentication parameters included in the received authentication request, wherein the authentication server is an authentication destination, and the authentication request includes organization information that identifies an organization to which the device belongs as one of the authentication parameters;
  when the authentication parameters included in the authentication request is determined to be insufficient, assigning one or more missing authentication parameters to the authentication request;
  sorting the authentication request according to the organization information included in the authentication request; and
  relaying the authentication request to the authentication server.

* * * * *